Dec. 20, 1932.  J. R. GILLIS ET AL  1,891,384
AIRCRAFT PROPELLER
Filed Aug. 4, 1930   2 Sheets-Sheet 1

INVENTORS.
Joseph R. Gillis
Frank P. Kaiser

BY Lancaster, Allwine & Rommel
ATTORNEYS.

Dec. 20, 1932.  J. R. GILLIS ET AL  1,891,384
AIRCRAFT PROPELLER
Filed Aug. 4, 1930  2 Sheets-Sheet 2

INVENTORS.
Joseph R. Gillis
Frank P. Kaiser

BY *Lancaster, Allwine and Rommel*
ATTORNEYS.

Patented Dec. 20, 1932

1,891,384

UNITED STATES PATENT OFFICE

JOSEPH R. GILLIS AND FRANK P. KAISER, OF LANSING, MICHIGAN

AIRCRAFT PROPELLER

Application filed August 4, 1930. Serial No. 472,950.

This invention relates to improvements in propellers for aircraft.

The primary object of this invention is the provision of improved propeller equipment for aircraft which embodies a very sturdy, easily operated and accurately adjustable mechanism by means of which the pitch inclination of the blades of the propeller may be readily and conveniently adjusted to suit atmospheric characteristics and the like.

A further object of this invention is the provision of a very sturdy mechanism by means of which a pilot during flight may change the pitch inclination of the propeller blades to suit engine operations, load and atmospheric characteristics. While we understand that heretofore attempts have been made to provide propellers for aircraft having variable pitch, and reversible propellers for watercraft have heretofore been provided, yet such devices are, to our knowledge, without exception, complicated and impractical, due to the number of complicated parts which admit of so much lost motion that vibration would prevent the practical use of an adjustable propeller, or such devices have been constructed so that strain has been duly placed upon parts which are not capable of withstanding huge strains brought to bear upon the propeller parts as an incident of aerial flight. A very important use of our invention will be the adaptation of adjustable pitch propellers to transport planes, so that the pilot during transfer of altitudes from dense coast line atmosphere to the rarefied air incident to the crossing of mountain ranges and the like, will be enabled to readily adjust the propeller pitch according to aerial characteristics. Heretofore, transport planes have been forced to various expedients, such as the equipping of motors with fixed high-pitch propellers and sacrificing efficiency in denser air for the performance at higher altitudes. Furthermore, our device, wherein the pitch of the propeller blade is under the control of the pilot will enable a plane starting on a long flight with a heavy load of gasoline to have its propeller blades adjusted as to pitch for quick and safe take-off, and subsequent economical adjustment after gaining cruising altitude and losing load incident to fuel consumption.

It is furthermore an object of our invention to provide a variable pitch propeller for aircraft which will enable the pilot to balance the efficiency of the propeller in relation to the efficiency of the engine during transfer of altitudes from dense to rare atmosphere or vice versa.

An additional object is that by means of our improved blade adjusting mechanism for aircraft a plane making a power dive with engine speed cut down would have its propeller efficiency maintained in spite of tremendous air speed and pressure by increasing the pitch of the blade to a very high angle.

Other objects and advantages of this invention will be apparent during the course of the following detailed description.

In the accompanying drawings, forming a part of this specification, and wherein similar reference characters designate corresponding parts throughout the several views, Figure 1 is a side elevation of the fore part of an aircraft showing the improved propeller mechanism and means for adjusting the pitch of the blades thereof in associated relation to an instrument board and other parts of an aircraft.

Figure 5:
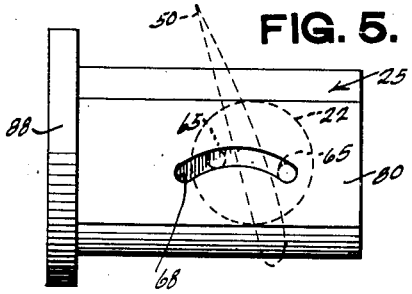
Figures 5 and 6 are sectional views showing relation of the cam to the pitch inclination of the blades for low and high pitch inclinations respectively.

In the drawings, wherein for the purpose of illustration is shown only a preferred embodiment of the invention, the letter A may generally designate an aircraft having the improved propeller mechanism B mounted thereon and having means for adjusting the pitch inclination of the blades thereof.

The aircraft A includes a fuselage or supporting frame 10, whereon the engine 11 is supported in any approved conventional relation. The engine 11 includes a propeller drive shaft 12 which is preferably solid and unaltered in characteristics, so far as its sufficiency in driving the improved propeller B is concerned.

The improved propeller B includes a hub casing structure 20, having radially extending socket arms 21 for adjustably receiving the blades 22 therein; it being understood that any number of the blades 22 may be provided consistent with the character of the aircraft to which the propellers are to be attached.

The hub casing structure 20 is suitably keyed for rotation with the shaft 12, and within the said casing structure 20 is disposed cam sleeve 25 slidably splined upon the shaft 12 and in operative cam connection with the propellers 22 to adjust the pitch inclination of the latter.

The means C is operatively controlled from the instrument board D of the aircraft for moving the cam sleeve 25 longitudinally of the shaft 12 for adjusting the pitch inclination of the blades 22.

Referring in detail to the structure of the propeller apparatus the hub casing 20 includes the substantially cylindrical hub body 35 which receives the motor driven shaft 12 therein in spaced relation. At its outer end the hub casing body 35 is provided with a detachable cap 38, detachably connected in a sturdy relation with the hub casing at 39. This cap 38 is provided with a passageway 40 therethrough, which receives the reduced end 41 at the outer end of the propeller drive shaft 12, and which is keyed to the cap 38 at 42. The outer end of the propeller drive shaft 12 is screw threaded and receives a nut 44 for connecting the drive shaft to the cap 38 in an effective relationship.

The arms 21 are integrally connected with the body 35 of the hub casing structure, and are hollow to provide sockets for receiving the bearing ends of the propellers 22 therein. The passageways 45 through these arms 21 are preferably uniform in diameter and at their inner ends they enter the large passageway 46 through the hub casing body 35. At their outer ends the arms 21 are detachably provided with caps 47, held in place by bolts 48 for the purpose of adjusting suitable thrust bearings 49 in place against the enlarged inner ends of the propellers 22, for the purpose of effectively holding the position of the propellers.

Figure 1:
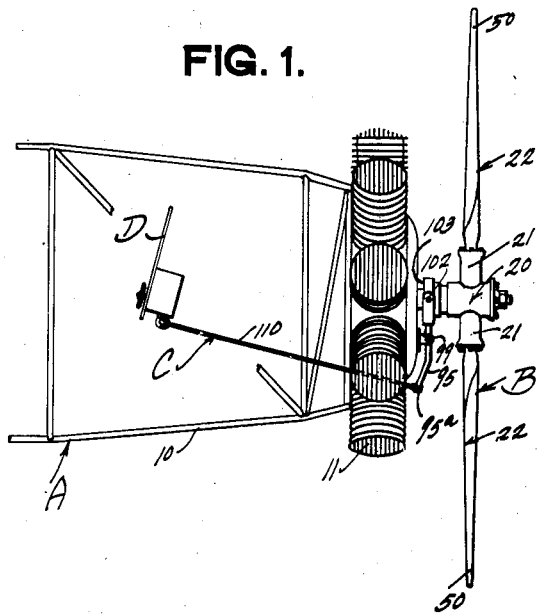
Figure 2:
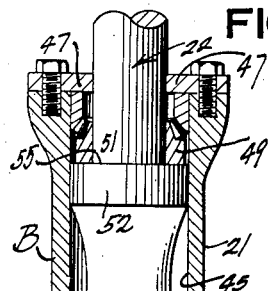
Figure 2 is a fragmentary sectional view taken longitudinally of the driving shaft of the propeller, showing the improved means for adjusting the pitch inclination of the blades of the propeller.

The propellers 22 each include the blade portion 50, shown best in Figure 1 of the drawings, which adjacent to the hub structure, is reduced to provide a substantially solid circular flange portion 51, shown in Figure 2, which at the extreme inner end thereof is provided with a pair of enlarged circular disc-like bearings 52 and 53, in spaced relation; the portion between the bearings 52 and 53 being smaller. The bearings 52 and 53 are of a diameter to rotatably fit in the passageway 45 of the arms 21, without any tipping or lost lateral movement, thus effectively positioning the propeller upon the hub arm 21 without any rocking movement of the propeller laterally of its axis. The thrust bearings 49 engage against the shoulders 55 of the outer bearings 52 on the propeller blades; the caps 47 being adjustable to properly clamp the bearings 49 between the shoulders 55 and said caps. The bearings are of such nature that they take the centrifugal thrust of the propellers. Suitable shims may be used between the outer end of the respective arms 21 and the caps 47 in order to compensate for wear on the thrust bearings 49. The extreme inner end of the bearing portion 53 of each of the propeller blades is provided with a pair of spaced studs or extensions 65, preferably circular in cross section and relatively short; the same being adaptable for cooperation in the arcuated cam slots 68 formed in the outer peripheral surfaces, in general longitudinally of the sleeve-like cam 25 to be subsequently described.

Figure 3:
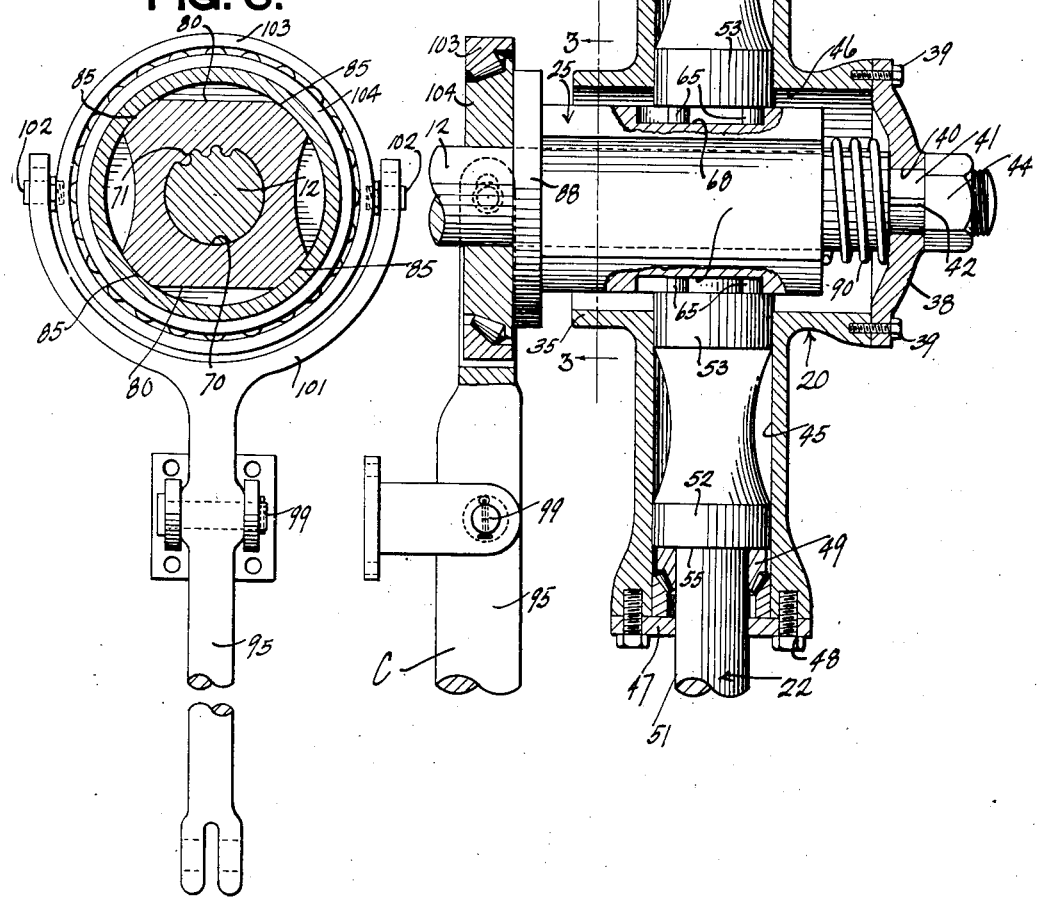
Figure 3 is a fragmentary sectional view taken through the mechanism substantially on the line 3—3 of Figure 2.

The cam 25 is longitudinally slidable in the passageway 46 of the hub casing body 35. It is of elongated sleeve-like structure and provided with a passageway 70 longitudinally therethrough which receives the engine driven shaft 12 therein; the latter as well as the internal periphery of the sleeve passageway 70 being provided without an intermeshing arrangement of longitudinal ribs and grooves, shown at 71 in Figure 3 of the drawings, which splines the cam sleeve 29 on the propeller drive shaft 12.

For a two blade propeller such as shown in the drawings, the cam sleeve 25 is provided with diametrically opposed flattened surfaces 80, wherein the cam slots 68 are provided. These cam slots 68, as shown more clearly in Figures 5 and 6 of the drawings, are arranged longitudinally of the sleeve 25, and struck from relatively large radii. The sleeve 25 may have a four-point bearing, for sliding in the passageway 46, as designated at 85 in Figure 3 of the drawings; thus reducing not only the bearing surface which it frictionally engages upon the body of the hub casing structure, but enabling a proper flattening of the said cam sleeve 25 for effective cam connection of the blades therewith. At the aircraft end of the hub structure 20, the cam 25 is provided with an enlarged disc-shaped head 88 against which the operating means, to be subsequently described, engages to permit of the shifting of the cam 25 back and forth for the purpose of adjusting the pitch inclination of the blades 50.

Figure 6:
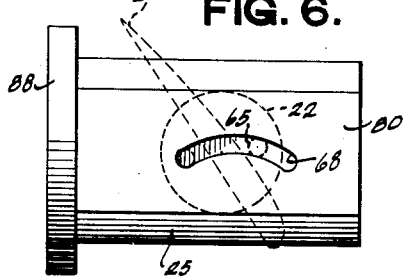
Figure 7:
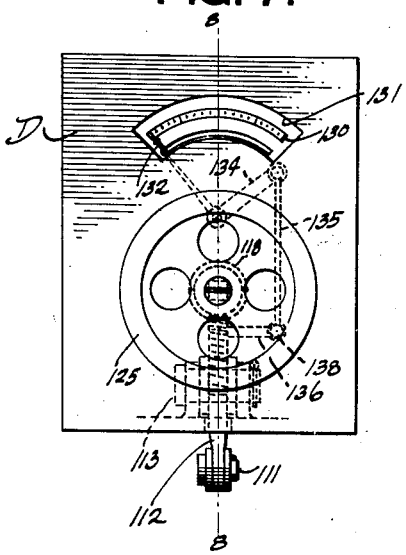
Figure 7 is a front view of one part of the instrument board wherein the pitch is indicated to the pilot, showing also the manual control means which the pilot uses to adjust the pitch of the blades.

As shown in Figure 2 of the drawings a powerful preferably spiral spring 90 is employed in the hub structure, bearing at one end against the cap 38, and at its opposite end against the facing end of the cam sleeve 25, and being under compression for urging the cam sleeve 25 in the direction of the adjusting or operating means C. The spring 90 urges the cam 25 in such relation that it normally tends to rotate the blades 50 of the portions 22 to a low pitch, as shown in Figure 5 of the drawings, and the operating means C must be brought into play to move the cam 25 for the purpose of increasing the pitch of the propeller blades, in the relation shown between Figures 5 and 6 of the drawings.

Referring to the operating means C, the same preferably consists of a lever 95, pivoted or fulcrumed at 99 between its ends upon some fore portion of the frame structure of the aircraft or engine. The upper or hub facing end of the lever 95 is preferably forked at 101, having swivel pin connection at 102 with the outer ring-shaped race 103 of an anti-friction bearing, whose inner race 104 is longitudinally slidable upon the shaft 12, and it may be splined thereon if necessary; the said inner race 104 operating against the disc end 88 of the cam 25, so that upon movement of the lever 95 the cam 25 may be moved for increasing the pitch inclination of the propeller blades, or moved in an opposite direction to permit the spring 90 to move the cam for decreasing the pitch inclination of the blades. The end of the lever 95 opposite its forked end is pivotally connected with the fore end of a connecting rod 110. The latter has a pivoted connection at 111 with a second lever 112 which is pivoted at 113 within a suitable casing structure 114 carried upon the instrument board D. This lever 112 has its connecting rod connection 111 at one side of pivot 113, and at the opposite side of the pivot 113 is formed a segmental gear 117 intermeshing with a worm 118. The latter bears at 119 in the rear wall 120ª of the casing 114, and rotatably extends through a suitable thrust bearing 120 in the instrument board D or front panel of the casing 114; forwardly of the instrument board D being provided with an operating handle 125. It is readily apparent that upon rotation of the operating handle 125 the lever 112 will be moved for moving the lever 95 through the connecting rod 110, to accomplish the purposes above described.

Figure 8:
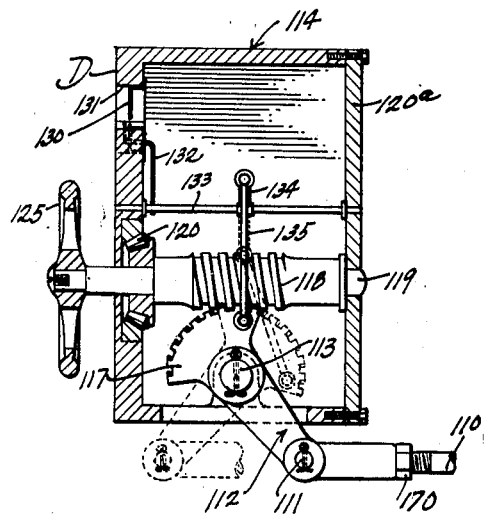
Figure 8 is a sectional view taken through the controlling means which the operator manually adjusts to permit of variation in pitch inclination.
Figure 4:
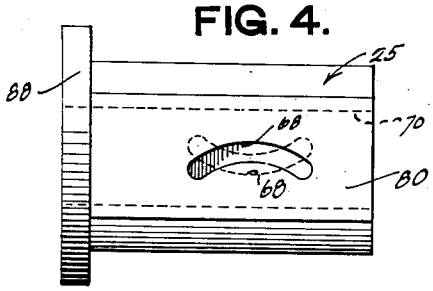
Figure 4 is a side elevation of the blade pitch adjusting cam of the improved mechanism.

Means is provided in the casing 114 and in relation to the instrument board D for determining the exact angle of pitch inclination of the blade. This means preferably comprises a suitable dial strip 130 mounted in an opening 131 on the instrument board D. A suitable pointer 132 is operatively associated therewith; being keyed upon a shaft 133 which rotatably bears in the casing 140, as shown in Figure 8 of the drawings. This shaft 133 has an arm 134, keyed therewith, preferably in a bell crank relation with the pointer arm 132. The outer end of the arm 134 is connected by a ball and socket joint with a link 135 which connects said arm 134 with an arm 136 which is mounted upon the segment 117; through the intermediary of the ball and socket joint 137. It is quite apparent that movement of the segment 117 to accomplish a variation in pitch angle inclination of the blades will cause a turning of the shaft 133 in proportionate relation, so that the pointer 132 will indicate upon the dial strip 130 the true angle of the blades of the propeller.

With the arrangement of details shown, we have found that a 20° change in the pitch of the propeller blades may be obtained with less than a 1-inch throw, that is, a one-inch sliding of the cam longitudinally of the propeller drive shaft 12. A screw threaded adjusting connection 170, shown in Figure 8, enables a proper calibration in the mechanism, preventing lost play, and suitable adjustment of the pointer 132 and lever 134 of the shaft 135 will enable calibration of the pointer with respect to the dial.

The two-lug connection of the propeller blades in the cam slot 68 provides a very effective and durable relation preventing the liability of lost play.

It is to be noted particularly that the drive of the propellers is accomplished from the shaft 12 through the connection of the hub structure 20 at the cap end of the housing; the lugs 65 at their connection with the cam 25 carrying only the torque incident to changing and holding the pitch of the blades.

The large radius of cam slot 68 is used to vary the pitch of the blades for a forward drive of the aircraft, that is, the change of angle is all to one side of the plane through the axes of the propellers, and give a very tremendous leverage for the changing of the pitch angle; enabling a proper and exact adjustment, and reduces friction and wear to negligible quantities.

It is to be particularly noted that the propeller axes rotate in a definite non-shiftable plane with respect to the longitudinal axis of the driving shaft, and the latter is not interfered with in structure so as to sacrifice any strength or efficiency thereof. In fact, with the exception of the operating mechanism there are only three principal parts, which are assembled in a very durable relationship. That is, the hub structure; the bearing of the blade in the hub structure, and the relation which the cam sleeve bears to the hub structure and associated end of the propeller blade.

Various changes in the shape, size, and arrangement of parts may be made to the form of invention herein shown and described, without departing from the spirit of the invention or the scope of the claims.

We claim:

1. In a pitch angle blade changing propeller structure the combination of a propeller shaft, a hub keyed to the shaft, a plurality of propeller blades oscillatively mounted in the hub structure on definite non-tipping axes therein, a cam sleeve slidably splined on the propeller shaft having a plurality of arcuated slots longitudinally arranged therein in general line transverse to the axes of the blades, each blade having a plurality of relatively spaced rigid lugs thereon all of which are in cam engagement in the same adjacent cam slot of said sleeve so that upon longitudinal movement of the sleeve upon the propeller shaft the blades will be respectively turned on their axes for changing the pitch angles thereof.

2. In a pitch angle blade changing propeller structure the combination of a propeller shaft, a hub keyed to the shaft, a plurality of propeller blades oscillatively mounted in the hub structure on definite non-tipping axes therein, a cam sleeve slidably splined on the propeller shaft having a plurality of arcuated slots longitudinally arranged therein in general line transverse to the axes of the blades, each blade having a plurality of relatively spaced rigid lugs thereon all of which are in cam engagement in the same adjacent cam slot of said sleeve so that upon longitudinal movement of the sleeve upon the propeller shaft the blades will be respectively turned on their axes for changing the pitch angles thereof, and spring means normally urging the sleeve longitudinally on the shaft in one direction.

3. In a pitch angle blade changing propeller structure the combination of a propeller shaft, a hub keyed to the shaft, a plurality of propeller blades oscillatively mounted in the hub structure on definite non-tipping axes therein, a cam sleeve slidably splined on the propeller shaft having a plurality of arcuated slots longitudinally arranged therein in general line transverse to the axes of the blades, each blade having a plurality of relatively spaced rigid lugs thereon all of which are in cam engagement in the same adjacent cam slot of said sleeve so that upon longitudinal movement of the sleeve upon the propeller shaft the blades will be respectively turned on their axes for changing the pitch angles thereof, spring means normally urging the sleeve longitudinally on the shaft in one direction, and operating means for moving the sleeve counter to spring action and holding it in an adjusted position.

4. In a propeller structure for aircraft the combination of a drive shaft, a hub structure including a cylindrical hub body having an end wall keyed with the end of the drive shaft and with the drive shaft extending through the cylindrical hub body in spaced relation therein, a cam sleeve splined on the drive shaft within said hub body, said hub body having laterally extending hollow arms rigid therewith, blades oscillatively bearing in said arms, said cam sleeve having cam slots therein each slot facing the adjacent end of a blade, each of said blades having a pair of spaced apart lugs thereon slidable in their adjacent cam slot whereby upon longitudinal movement of the cam sleeve along said drive shaft the blades will be rotated for changing the pitch angles thereof.

5. In a pitch angle blade changing propeller structure the combination of a propeller shaft, a hub keyed to the shaft, a plurality of propeller blades oscillatively mounted in the hub in definite non-tipping axes therein, a cam sleeve slidably splined on the propeller shaft for longitudinal movement therealong, the cam sleeve having a plurality of slots laterally opening therefrom and arcuated longitudinally therealong, one arcuate slot being provided for each propeller blade and directly facing the adjacent end of the propeller blade, each propeller blade having a pair of lugs at the end thereof adjacent the facing slot and extending into the slot, said pair of lugs for each blade being disposed at opposite sides of the longitudinal axis of the blade so that upon longitudinal movement of the cam sleeve along the propeller shaft the blades will be turned on the respective axes for changing the pitch angles thereof, and means for operatively controlling the positioning of said sleeve along said propeller shaft.

JOSEPH R. GILLIS.
FRANK P. KAISER.